（12) United States Patent
Kim

(10) Patent No.: US 6,490,015 B1
(45) Date of Patent: Dec. 3, 2002

(54) LIQUID CRYSTAL DISPLAY MODULE HAVING A LIGHT WAVEGUIDE PLATE AND A MAIN SUPPORTING FRAME

(75) Inventor: Hyo Jin Kim, Kyongnam (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/550,074

(22) Filed: Apr. 14, 2000

(30) Foreign Application Priority Data

Apr. 14, 1999  (KR) .............................................. 99-13095

(51) Int. Cl.⁷ ........................................... G02F 1/1333
(52) U.S. Cl. ........................... 349/58; 349/65; 348/838; 361/32
(58) Field of Search ..................... 349/58, 65; 348/838; 361/32

(56) References Cited

U.S. PATENT DOCUMENTS 5,835,139 A * 11/1998 Yun et al.
5,966,191 A * 10/1999 Lee
6,046,785 A * 4/2000 Won
6,130,658 A * 10/2000 Yamamoto et al.

FOREIGN PATENT DOCUMENTS

KR   1998063689   11/1998

OTHER PUBLICATIONS

Abstract: No. 1998–63689; dated Nov. 25, 1998; Title: "Back Light Device Structure of Liquid Crystal Display Device".

* cited by examiner

*Primary Examiner*—William L. Sikes
*Assistant Examiner*—Julie Ngo
(74) *Attorney, Agent, or Firm*—Birch, Stewart, Kolasch & Birch, LLP

(57) ABSTRACT

The invention eliminates light leakage in liquid crystal panel caused by burrs, i.e., protrusions, on a light waveguide plate causing misalignment when the light waveguide plate is seated in the main frame of a LCD module. The invention includes a a first frame located on the liquid crystal panel, and a second frame assembled with the first frame interposing the liquid crystal panel and the back light. The second frame has a recessed portion formed at a location corresponding to the protrusions of the light waveguide plate, wherein a distance from the fixed side wall of the light waveguide plate to the protrusions is sufficiently short so that dimensional variations between the protruding portion of the light waveguide plate and the recessed portion of the second frame are insignificant.

6 Claims, 4 Drawing Sheets

LIQUID CRYSTAL DISPLAY MODULE HAVING A LIGHT WAVEGUIDE PLATE AND A MAIN SUPPORTING FRAME

CROSS REFERENCE

This application claims the benefit of Korean Patent Application No. 1999-13095, filed on Apr. 14, 1999, under 35 U.S.C. §119, the entirety of which is hereby incorporated by reference.

BACKGROUND OF THE INVENTION

1. Field of the Invention

The present invention relates to a liquid crystal display (LCD) device, and more particularly, to a structure of a liquid crystal display module having a light waveguide plate and a main supporting frame.

2. Description of Related Art

Liquid crystal displays (LCDS) are gaining in popularity for use in systems such as television receivers, computer monitors, avionics displays, aerospace displays, and other military-related displays where the elimination of cathode ray tube (CRT) technology is desirable for several reasons. In particular, CRTs are characterized by large depth dimensions, undesirably high weight, and fragility. Additionally, CRTs require a relatively high voltage power supply in order to sufficiently accelerate electron beams for displaying images.

The aforementioned shortcomings of CRTs are overcome by flat panel liquid crystal displays in which matrix arrays of liquid crystal picture elements or pixels are arranged in a plurality of rows and columns. Patterns of information are thereby defined by the two dimensional array of pixels, which because of differences in the orientation of the liquid crystal material within each pixel, are caused to appear either darkened or transparent.

FIG. 1 is a perspective view illustrating a conventional LCD module, and FIG. 2 is a cross-sectional view taken along line II—II of FIG. 1. As shown in FIGS. 1 and 2, the LCD module 10 generally includes a display panel 20 comprising two substrates with a liquid crystal layer interposed therebetween, a back light device 30 having a lamp 36 as a light source arranged along a side of the LCD module 10, a metal frame 70 supporting the display panel 20 and the backlight device 30 together with a main frame 40.

The backlight device 30 further includes a protecting sheet 31, a diffusing sheet 32, a prism sheet 33, a light waveguide plate 34, and a reflecting sheet 35, which are stacked in above-described order. The light waveguide plate 34 serves to uniformly direct a light from the lamp 36 to the display panel 20, and its three side walls contact with corresponding portions of the main frame 40. The other side wall 50 of the light waveguide plate 34 contacts with the lamp 36 through a lamp housing 60 that surrounds the lamp 36 (see FIG. 3).

FIG. 3 is a perspective view illustrating a structure of a conventional LCD module having the light waveguide plate and the main frame. As shown in FIG. 3, the main frame 40 has a recessed portion 42 and the light waveguide plate 34 has a protruding portion 34a around a center of its side wall which is perpendicular to the longitudinal direction of the lamp 36. So the light waveguide plate 34 is accommodated in the main frame 40 when the protruding portion 34a is aligned with the recessed portion 42. Movement of the light waveguide plate 34 that may damage the lamp 36 is prevented owing to the engagement of the protruding portion 34a and the recessed portion 42.

FIG. 4 shows a different structure of another conventional LCD module having the waveguide plate and the main frame. As shown in FIG. 4, the main frame 40 has fixing portions 44 at both end portions thereof adjacent to the lamp 36 and the light waveguide plate 34 has recessed portions 34b at locations corresponding to the fixing portions 44 of the main frame 40 such the light waveguide plate 34 is accommodated in the main frame 40. Thus, movement of the light waveguide plate 34 that may damage the lamp 36 is prevented.

However, the structures of the light waveguide plate and the main frame described above have the following disadvantages.

As shown in FIG. 2, since the light waveguide plate 34 is generally fabricated through an injection molding process using a metal mold and the open portion of the mold corresponds to an upper edge of the light waveguide plate 34, it has burrs 38 formed on its upper edge. The burrs 38 are formed after the molding process due to the open portion. When the light waveguide plate 34 having the burrs is accommodated in the main frame 40 or when the light waveguide plate 34 moves, friction between the burrs 38 of the light waveguide plate 34 and the main frame 40 produces alien substances, leading to a bad display characteristics of the LCD.

Next, in general, dimensions of the light waveguide plate vary with the surroundings. And the dimension variation of the light waveguide plate is a product of a length and the coefficient of linear expansion. Therefore, when the coefficient of linear expansion is constant, its dimension variation becomes greater as it get far from a reference point of the light waveguide plate. But the main frame 40 seldom changes its dimension since it is usually made of polycarbonate whereas the light waveguide plate is usually made of acrylic resin. Referring to FIG. 3, note that the side wall 50 of the light waveguide plate 34 is a reference point since at that point the light waveguide plate 34 and the main frame 40 are fixed by the lamp housing 60. Since the protruding portion 34a of the light waveguide plate 34 is far from the side wall 50 of the light waveguide plate 34, the dimension variation difference between the recessed portion 42 of the main frame 40 and the protruding portion 34a of the light waveguide plate 34 is much larger. As a result, variation of a space "A" between the recessed portion 42 and the protruding portion 34a becomes as large as about ±0.3 mm. Therefore the light waveguide plate 34 may get out of the lamp housing of the lamp 36 during an impact test or being carried, leading to a problem in that light leakage (a bright line) may occur in the vicinity of the end portion of the display panel 20. In order to overcome such a problem, the structures of the light waveguide plate and the main frame in FIG. 4 have been introduced whose the fixing portion 44 and the recessed portion 34b are formed at both end locations adjacent to the lamp 36. In general, between the fixing portion 44 and the recessed portion 34b, a space "B" of 0.3 mm is required. This is because the light waveguide plate 34 is expanded during a high temperature test and gets bent so that the sheets 31, 32 and 33 (see FIG. 2) arranged over the light waveguide plate 34 get bent. Thus, space "B" of 0.3 mm between the fixing portion 44 and the recessed portion 34b is necessary. However, such a space "B" of 0.3 mm causes the light waveguide plate 34 to get out of the lamp housing 60 of the lamp together with dimension variation difference between the light waveguide plate 34 and the main frame 40 due to the surroundings such a temperature and humidity during an impact test or being carried, leading to a problem in that light leakage (a bright line) may occur in the vicinity of the end portion of the display panel 20.

SUMMARY OF THE INVENTION

In order to overcome problems described above, a preferred embodiment of the present invention provides a liquid crystal display device having good display characteristics and capable of preventing a bright line from occurring.

In order to achieve the above object, the present invention provides A liquid crystal display device module which includes a backlight device having a) a lamp; b) a lamp housing surrounding the lamp; c) a reflecting sheet for reflecting light from the lamp; d) a light waveguide plate having four side walls, one of the four side walls fixed to the lamp housing and another side wall adjacent to the fixed side wall having a protruding portion, the light waveguide plate being located on the reflecting sheet, and e) a plurality of sheets located on the light waveguide plate; a liquid crystal panel located on the backlight device; a first frame located on the liquid crystal panel; and a second frame assembled with the first frame interposing the liquid crystal panel and the back light, the second frame having a recessed portion formed at a location corresponding to the protruding portion of the light waveguide plate, wherein a distance from the fixed side wall of the light waveguide plate to the protruding portion is sufficiently short so that dimension variation between the protruding portion of the light waveguide plate and the recessed portion of the second frame is small enough to be ignored.

The distance from the fixed side wall of the light waveguide plate to the protruding portion of the light waveguide plate is less than 30 mm. Each upper edge of the four side walls of the light waveguide plate has burrs, and the second frame further includes at least one side wall having an inclined portion formed at a location corresponding to the burrs of the light waveguide plate, the inclined portion having an inclined length and an angle enough not to contact with the burrs. The angle of the inclined portion is about 45°. The inclined length of the inclined portion is about 0.3 mm.

BRIEF DESCRIPTION OF THE DRAWINGS

For a more complete understanding of the present invention and the advantages thereof, reference is now made to the following descriptions taken in conjunction with the accompanying drawings, and in which.

DETAILED DESCRIPTION OF PREFERRED EMBODIMENTS

Reference will now be made in detail to the preferred embodiment of the present invention, example of which is illustrated in the accompanying drawings.

Figure 1:
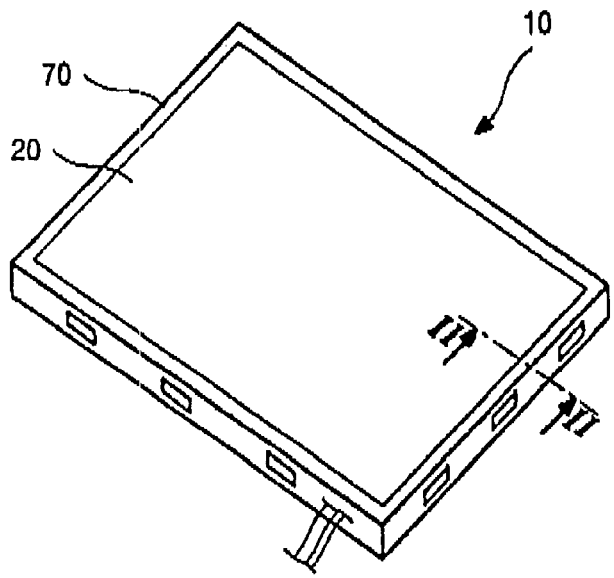
FIG. 1 is a perspective view illustrating a conventional LCD module.
Figure 2:
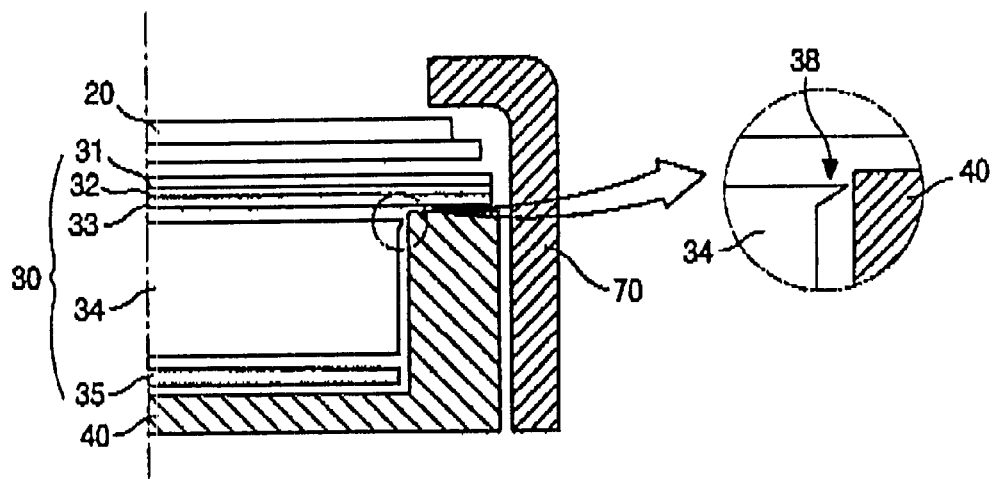
FIG. 2 is a cross-sectional view taken along line II—II of FIG. 1.
Figure 3:
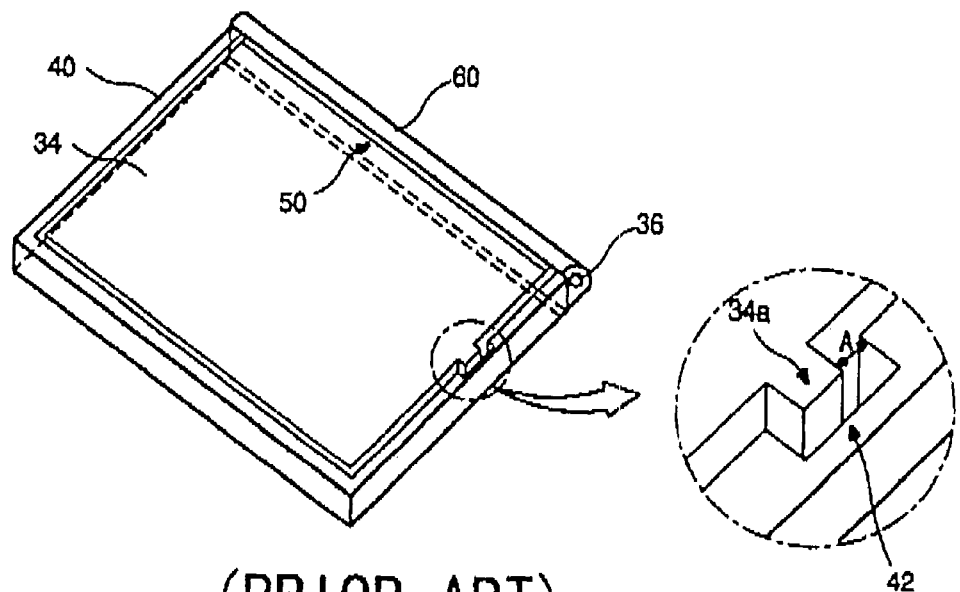
FIG. 3 is a perspective view illustrating structures of a light waveguide plate and a main frame for use in the conventional LCD module.
Figure 4:
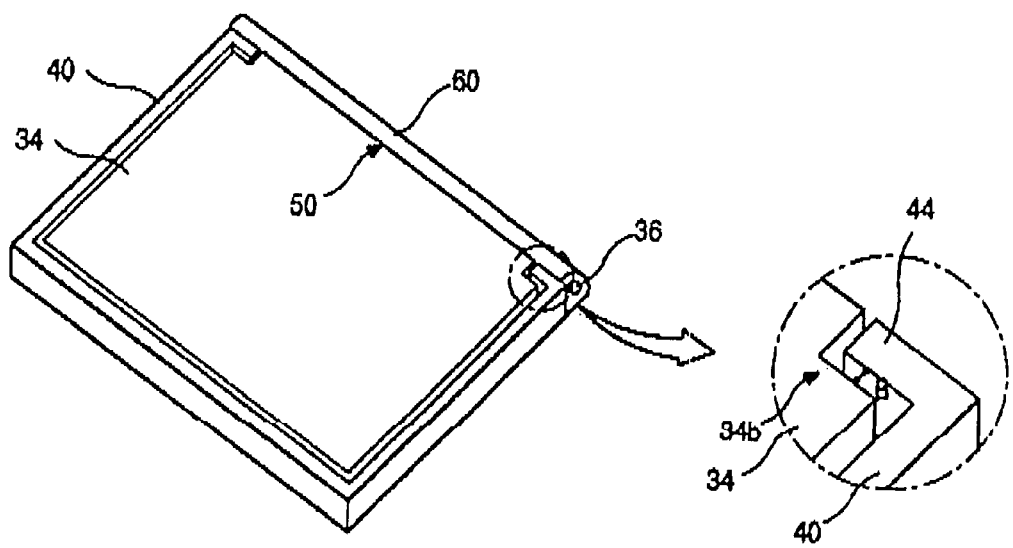
FIG. 4 is a perspective view illustrating different structures of the light waveguide plate and the main frame for use in the conventional LCD module.
Figure 5:
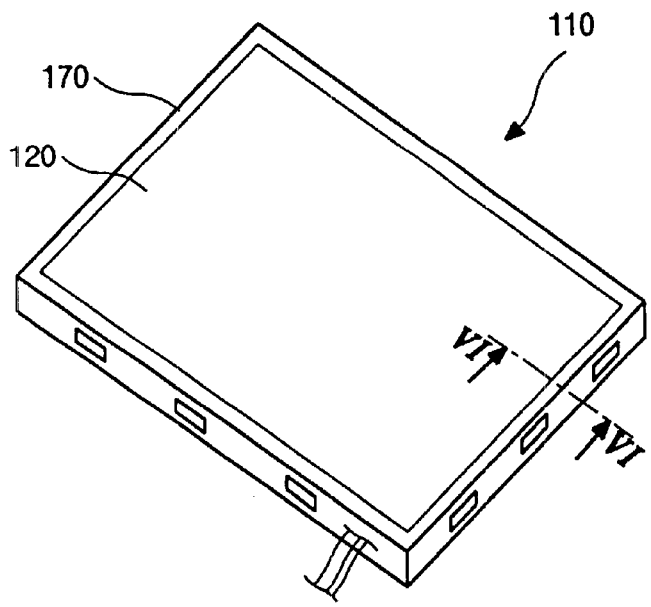
FIG. 5 is a perspective view illustrating a LCD module according to a preferred embodiment of the present invention.
Figure 6:
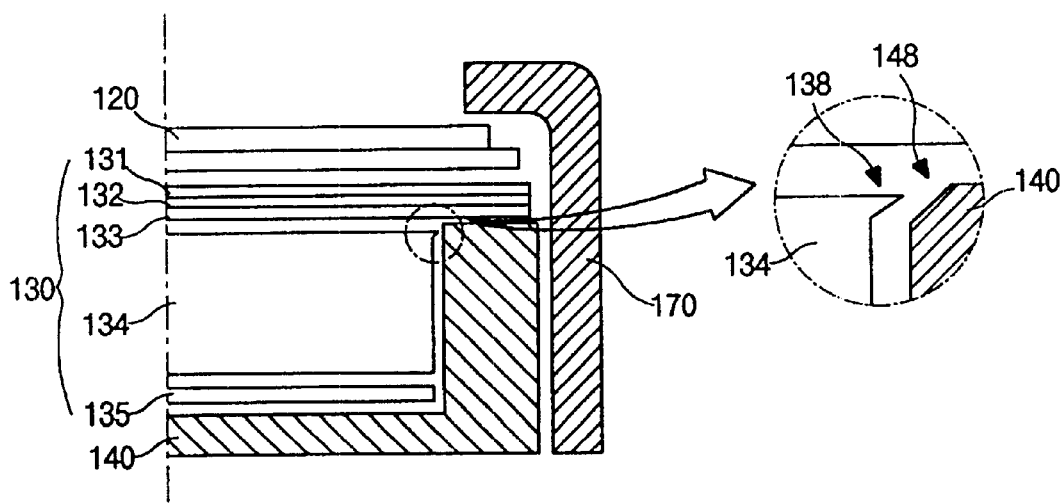
FIG. 6 is a cross-sectional view taken along line VI—VI of FIG. 5.

FIG. 5 is a perspective view illustrating a LCD module according to a preferred embodiment of the present invention, and FIG. 6 is a cross-sectional view taken along line VI—VI of FIG. 5. As shown in FIGS. 5 and 6, the LCD module 110, according to the preferred embodiment of the present invention, includes a display panel 120 comprising two substrates with a liquid crystal layer interposed therebetween, a back light device 130 having a lamp 136 as a light source arranged on a side of the LCD module 110, a metal frame 170 supporting the display panel 120 and the backlight device 130 together with a main frame 140.

The backlight device 30 further includes a protecting sheet 131, a diffusing sheet 132, a prism sheet 133, a light waveguide plate 134, and a reflecting sheet 135, which are stacked in above-described order. The light waveguide plate 134 serves to uniformly direct a light from the lamp 136 to the display panel 120, and its three side walls and bottom surface, respectively, contact with corresponding portions of the main frame 140. The other side wall 150 of the light waveguide plate 134 contacts with the lamp 136 through a lamp housing 160 that surrounds the lamp 136.

As shown in FIG. 6, the light waveguide plate 134 has burrs 138 at an upper edge thereof, and the main frame 140 has an inclined portion 148 at a location corresponding to the burrs 138, which preferably has an inclined angle about 45° and an inclined length of more than 0.3 mm such that when the light waveguide plate 134 is accommodated in the main frame 140 or when the light waveguide plate 134 moves, friction between the burrs 38 of the light waveguide plate 134 and the main frame 140 does not occur, thereby preventing alien substances that may lower display characteristics of the LCD from being produced.

Figure 7:
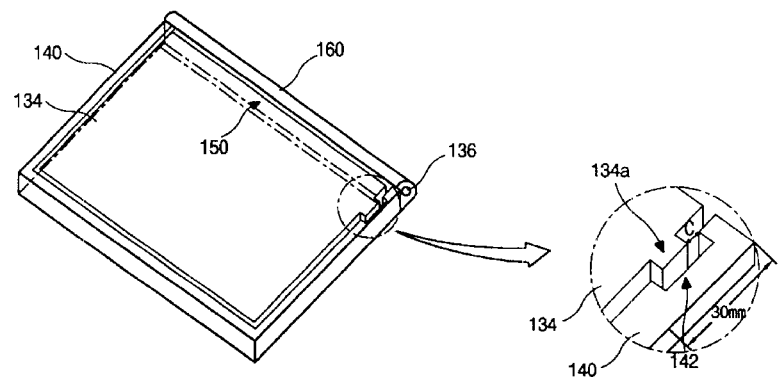
FIG. 7 is a perspective view illustrating structures of a light waveguide plate and a main frame according to the preferred embodiment of the present invention.

As shown in FIG. 7, the light waveguide plate 134 has a protruding portion 134a on only one side wall, and the main frame 140 has a recessed portion 142 at a location corresponding to the protruding portion 134a. And a distance from the side wall 150 to the protruding portion 134a of the light waveguide plate 134 is preferably less than 30 mm. Since the protruding portion 134a is adjacent to the side wall 150, the dimension variation difference between the protruding portion 134a of the light waveguide plate 134 and the recessed portion 142 of the main frame 140 can be small to be ignored. As a result, distance variation of a space "C" between the recessed portion 142 and the protruding portion 134a comes to be as small as 0.1 mm. Therefore, the light waveguide plate 134 does not get out of the lamp housing 160 of the lamp 36, and overcome is a problem in that light leakage (a bright line) may occur in the vicinity of the end portion of the display panel 20.

As described hereinbefore, by employing structures of the light waveguide plate and the main frame according to the preferred embodiment of the present invention, a liquid crystal display device having good display characteristics and capable of preventing a bright line from occurring can be attained.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid crystal display device module, comprising:

a backlight device having
- a) a lamp,
- b) a lamp housing surrounding the lamp,
- c) a reflecting sheet for reflecting light from the lamp,
- d) a light waveguide plate having four side walls, one of the four side walls fixed to the lamp housing and another side wall adjacent to the fixed side wall having a protruding portion, the light waveguide plate being located on the reflecting sheet, and
- e) a plurality of sheets located on the light waveguide plate;

a liquid crystal panel located on the backlight device;

a first frame located around the liquid crystal panel; and a second frame assembled with the first frame interposing the liquid crystal panel and the back light, the second frame having a recessed portion formed at a location corresponding to the protruding portion of the light waveguide plate, wherein a distance from the side wall fixed to the lamp housing of the light waveguide plate to the protruding portion is as small as about 0.1 mm, so that distance variation between the protruding portion of the light waveguide plate and the recessed portion of the second frame is small enough to be ignored.

2. The liquid crystal device of claim 1, wherein the distance from the side wall fixed to the lamp housing of the light waveguide plate to the protruding portion structure of the light waveguide plate is less than 30 mm.

3. The liquid crystal display device of claim 2, wherein at least one upper edge of the four side walls of the light waveguide plate has burrs, and the second frame further includes at least one side wall having an inclined portion formed at a location corresponding to the burrs of the light waveguide plate, the inclined portion having an inclined length and an angle, whereby the second frame does not contact the burrs.

4. The liquid crystal display device of claim 3, wherein the angle of the inclined portion to the side wall is about 45°.

5. The liquid crystal device of claim 3, wherein the length of the inclined portion is about 0.3 mm.

6. The liquid crystal device of claim 3, wherein the inclined length of the inclined portion is more than about 0.3 mm.

* * * * *